May 11, 1937.  H. N. COX  2,080,165
MAXIMUM LOAD INDICATOR FOR TESTING MACHINES
Filed April 5, 1933  2 Sheets-Sheet 1

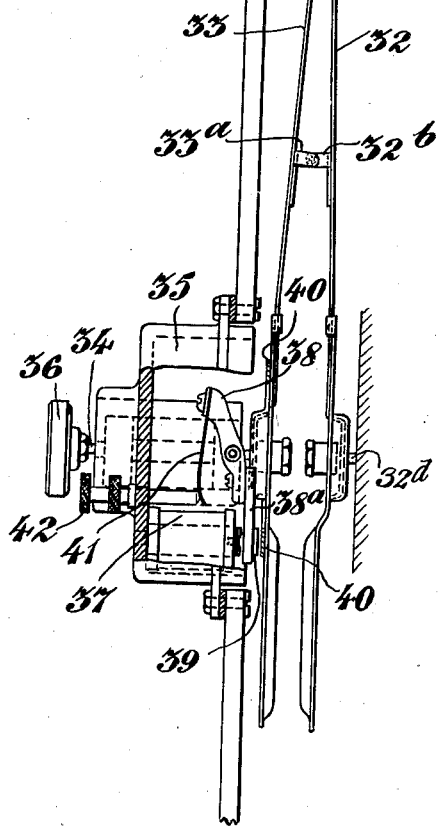
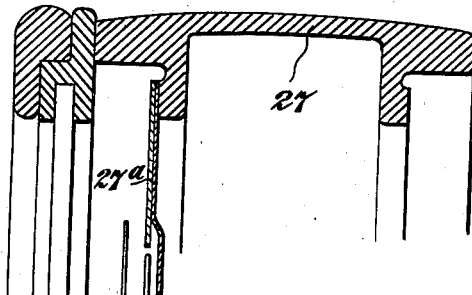
Fig. 2.
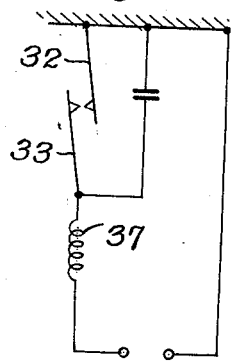
Fig. 3.
Inventor: Herbert Nelson Cox.
Per: George E. Folkes
Attorney.

Patented May 11, 1937

2,080,165

UNITED STATES PATENT OFFICE 2,080,165

MAXIMUM LOAD INDICATOR FOR TESTING MACHINES

Herbert Nelson Cox, Birmingham, England, assignor to W. & T. Avery Limited, Birmingham, England Application April 5, 1933, Serial No. 664,515
In Great Britain April 11, 1932

4 Claims. (Cl. 265—1)

This invention has reference to improvements in hydraulic testing machines and has for its object the provision of an improved means for giving a visible indication of the maximum load applied in a hydraulic testing machine.

The invention consists of an improved hydraulic testing machine which incorporates an automatically operating visible indicating mechanism having a main load indicating pointer which is responsive to the conditions obtaining in the pressure lines and an auxiliary pointer which is moved by the said main pointer and which is provided with a contact which co-operates with a contact carried by the main pointer to control the circuit through an electro-magnetic device which normally maintains one section of a braking device out of contact with the co-operating section which is carried by the auxiliary pointer, said braking device coming into operation to brake the auxiliary pointer when the main pointer moves away from the auxiliary pointer after the maximum load has been attained thus affording an indication of the said maximum load.

The invention will now be described with particular reference to the accompanying sheets of drawings, wherein:—

Figure 2 is a fragmentary view on an enlarged scale illustrating means for enabling an indication to be obtained of the maximum load applied during a test, and Figure 3 is a diagrammatic representation of the electrical circuit sufficient to render the operation of the invention clear.

Figure 1:
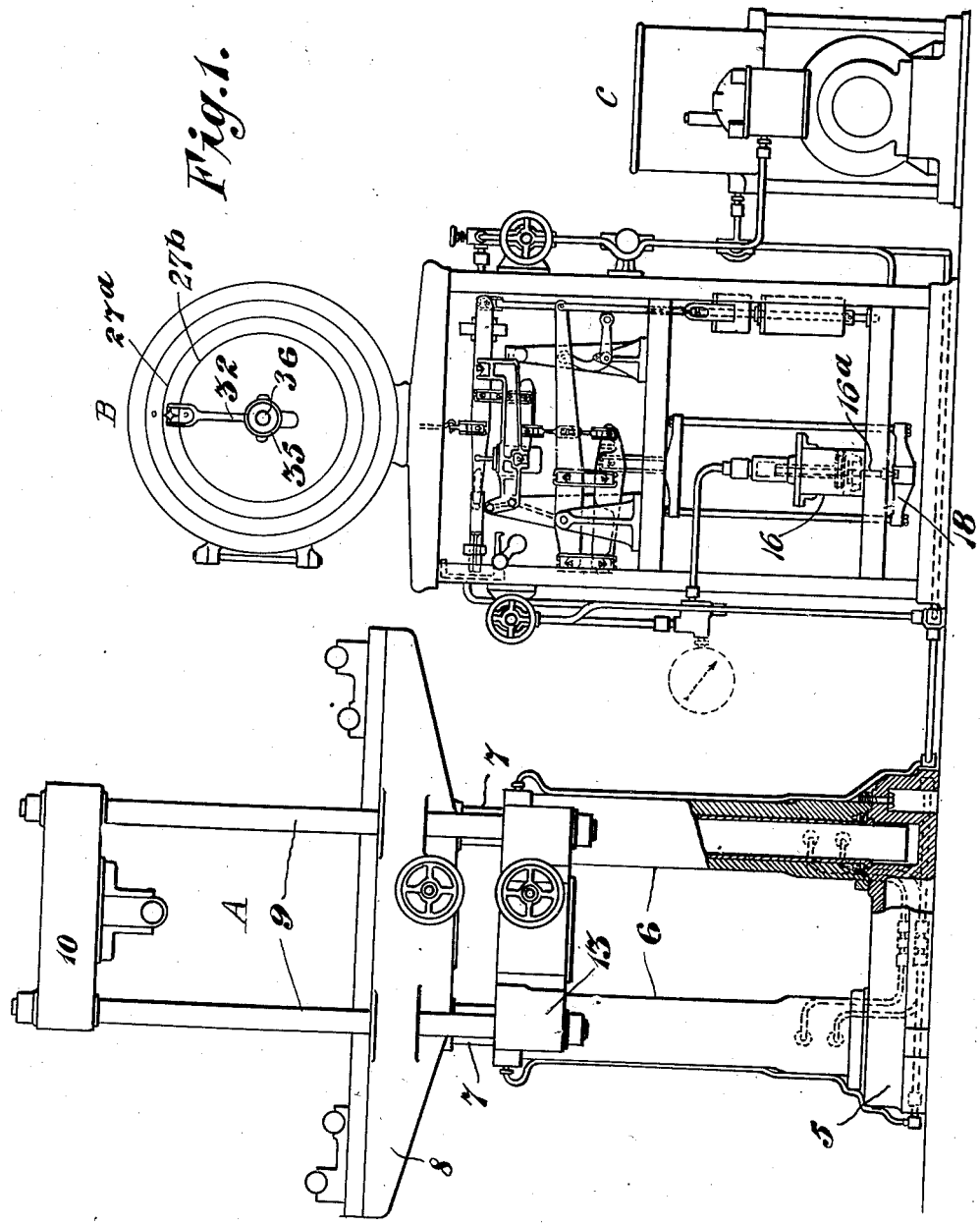
Figure 1 is a part sectional front elevation of the improved hydraulic testing machine having the improved load indicating mechanism embodied therein.

The testing machine illustrated in the drawings comprises a testing unit A, an indicating unit B and an electrically operated pump unit C.

The testing unit A is constituted by a base 5 carrying a pair of parallel tubular uprights 6 the bores whereof constitute hydraulic cylinders for a pair of rams 7. These rams 7 are connected at their upper ends by a cross-head 8 the motion of which is guided by a pair of parallel rods 9 secured to the base 13 of the testing unit. The aforesaid rods 9 are interconnected at their upper ends by a bridge 10.

The cross-head 8 and bridge 10 are adapted to be provided with gripping means for the specimen of known kind.

The cylinders 6 are connected with the pump C and with a differential ram cylinder 16 the ram 16ª whereof, through a yoke 18 and interposed lever mechanism, transmits the load to an automatic indicating mechanism enclosed within a casing 27. The said automatic indicating mechanism is provided with indicating media on each side and is preferably of the kind disclosed in the prior United States patent specification No. 1,672,143 dated 5th June 1928.

The differential ram 16ª ensures a reduction in the hydraulic pressure which is transmitted to the indicating unit B.

The indicating mechanism is provided at each side with two charts 27ª, 27ᵇ, the chart 27ª corresponding to the lower capacity of the indicating mechanism and the other to the higher capacity the arrangement being one well known to those skilled in the art. The charts 27ª, 27ᵇ at one side cooperate with a pointer 32 termed the main pointer 32 mounted on the shaft 32ᵈ of the indicating mechanism. This main pointer 32 carries an arm 32ᵇ having an electrical contact which co-operates with and is disposed in the path of an electrical contact carried by an arm 33ª. This arm 33ª is secured to a rotatable auxiliary pointer 33 which is mounted on a spindle 34 the axis of which is coincident with the axis of the main pointer 32. The spindle 34 is mounted in bearings carried by a casing 35 fixed to the centre of the casing 27 containing the weight indicating mechanism. On its outer end the spindle 34 carries a knob 36 to permit manual operation of the pointer 33 as required. The contact carried by the arm 33ª of the pointer 33 is included in an electric circuit containing the solenoid of an electro-magnetic device 37 which is located within the casing 35. The armature of this electro-magnetic device is constituted by the longer arm of a lever 38 which has fixed to its inner face a brake pad 39. This brake pad 39 co-operates with a circular braking surface 40 fixed to the auxiliary pointer 33 and arranged concentrically with the axis thereof. The solenoid of the electro-magnetic device 37 is normally energized and consequently tends to maintain the brake pad 39 out of contact with the braking surface. The lever 38 co-acts with a leaf spring 41 which tends to move the brake pad into the braking position, a screw 42 being provided for varying the tension of the aforesaid leaf spring 41.

The operation of the invention is as follows assuming a compression test is to be effected:—

The specimen is secured by gripping means carried by a cross-head 8 and bridge 10 whereupon the motor is put into operation and the inlet valve opened so as to permit fluid to enter the cylinders 6 and through the rams 7 to cause the cross-head 8 to exert the compressive force on the specimen. The pressure applied in the cylinder 6 is transmitted to the differential ram cylinder 16 and thence through the yoke 18 and intermediate lever system to the automatic indicating mechanism thus causing the pointer 32 to move round the charts 27$^a$, 27$^b$ and indicate the force applied. The forward movement of the pointer 32 by reason of the engagement of the contacts carried by the arms 32$^b$ and 33$^a$ causes the auxiliary pointer 33 to be carried round with the pointer 32. After the maximum load has been attained the pointer 32 moves away from the auxiliary pointer 34 whereby the connection between the contacts carried by the arms 32$^b$, 33$^a$ is broken and the electro-magnetic device 37 de-energized. Consequently the brake pad 39 is moved into contact with the braking surface 40 under the influence of the spring 41 and the auxiliary pointer 33 thus maintained in a position indicative of the maximum load applied. The pointer 33 is moved to the zero position by means of the knob 36 and when the contacts carried by the arms 32$^b$, 33$^a$ come together at the zero graduations the electro-magnetic device 37 is re-energized and the braking force consequently withdrawn from the pointer 33.

I claim:

1. In a testing machine, a maximum load indicating mechanism comprising a main pointer, an auxiliary pointer adapted to be carried round by the main pointer when moving in a forward direction, a section of a braking device carried by said auxiliary pointer, an electro-magnetic device, a complementary section of the aforesaid braking device controlled by said electro-magnetic device, an electric contact carried by the main pointer and included in the electrical circuit through the solenoid of the electro-magnetic device and an electric contact carried by the auxiliary pointer and also included in the electrical circuit through the solenoid of the electro-magnetic device, said contacts co-operating to control the circuit through the electro-magnetic device so that the braking device is inoperative when the pointers are moving together but operative when the main pointer moves away from the auxiliary pointer as obtains when the maximum load has been applied whereby the auxiliary pointer is left in a position indicative of the said maximum load.

2. In a testing machine, a maximum load indicating mechanism comprising a main pointer, an auxiliary pointer movable by said main pointer, electrical contacts carried by the main and auxiliary pointers, an electro-magnetic device, an armature for said electro-magnetic device having a brake pad, a braking surface carried by the auxiliary pointer and arranged concentrically with the axis of rotation of the pointer and means acting in opposition to the electro-magnetic device which tends to move the brake pad into contact with the braking surface the contacts carried by the main and auxiliary pointers when in contact serving to complete the circuit through the electro-magnetic device whereby the brake pad is retained out of contact with the braking surface and when moved apart, as obtains after a maximum load has been attained, to break the circuit to allow the brake pad to move into contact with the braking surface to maintain the auxiliary pointer in the maximum load position.

3. A maximum load indicating mechanism according to claim 2 wherein means is provided for resetting the auxiliary pointer.

4. In a testing machine, a maximum load indicating mechanism comprising a main pointer, an auxiliary pointer movable by said main pointer, electrical contacts carried by the main and auxiliary pointers, an electro-magnetic device, an armature for said electro-magnetic device having a brake pad, a braking surface carried by the auxiliary pointer and arranged concentrically with the axis of rotation of the pointer and means acting in opposition to the electro-magnetic device which tends to move the brake pad into contact with the braking surface and means for resetting the auxiliary pointer.

HERBERT NELSON COX.